Sept. 11, 1956 D. W. KELBEL 2,762,237
TRANSMISSION
Filed May 2, 1951 3 Sheets-Sheet 1
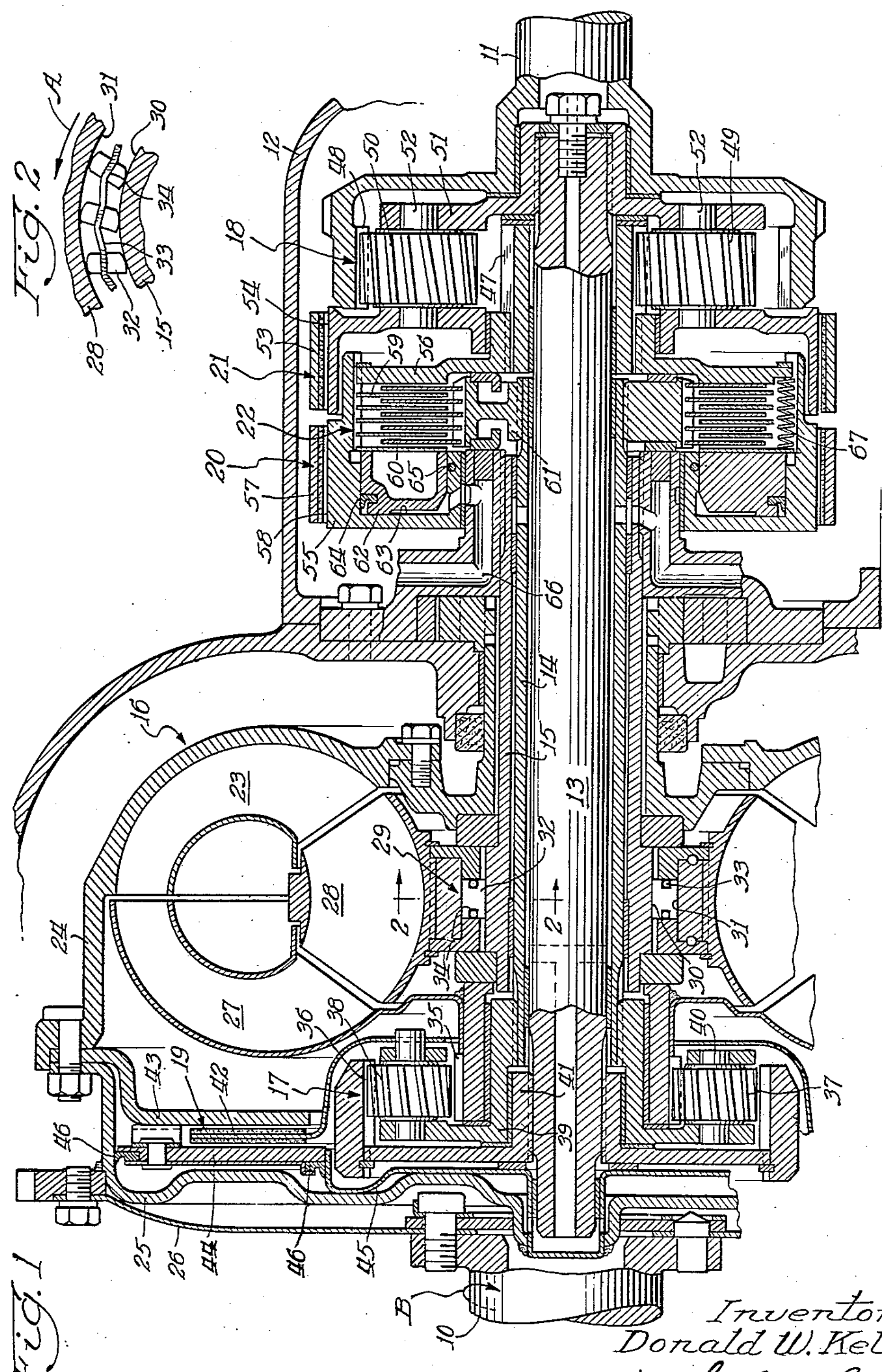

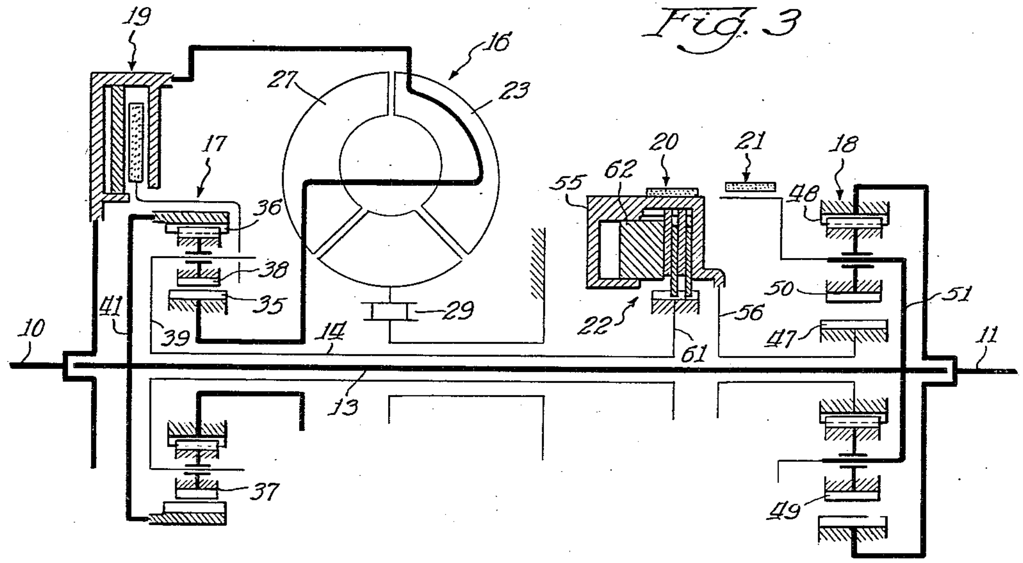
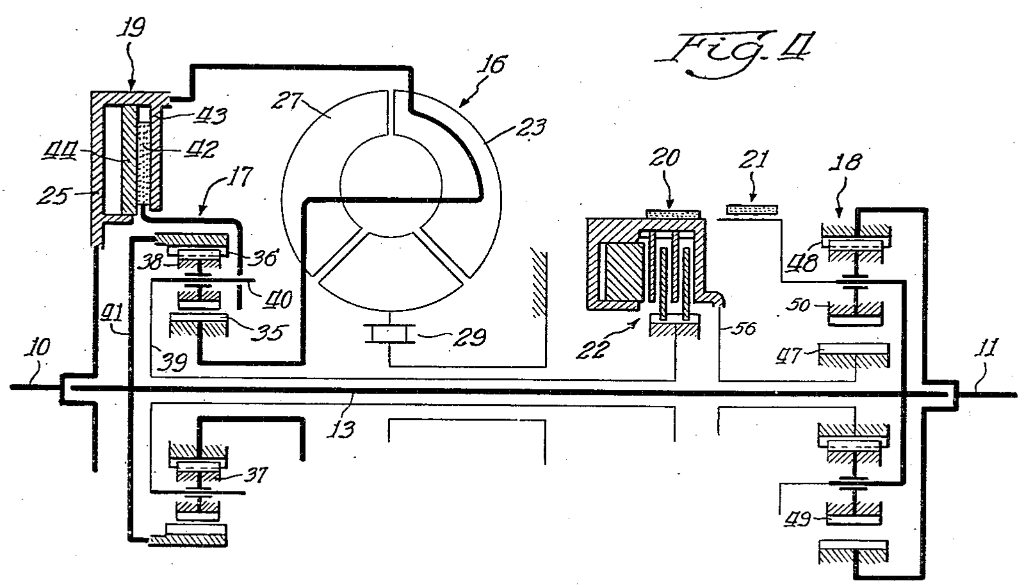
Inventor:
Donald W. Kelbel
By Keith T. Blever
Atty

Sept. 11, 1956 D. W. KELBEL 2,762,237
TRANSMISSION
Filed May 2, 1951 3 Sheets-Sheet 3
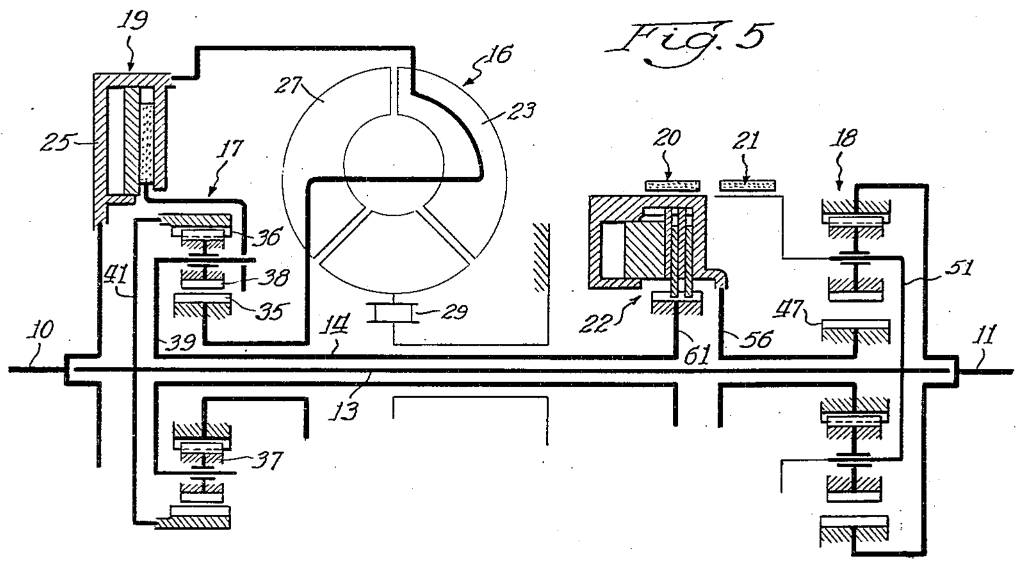
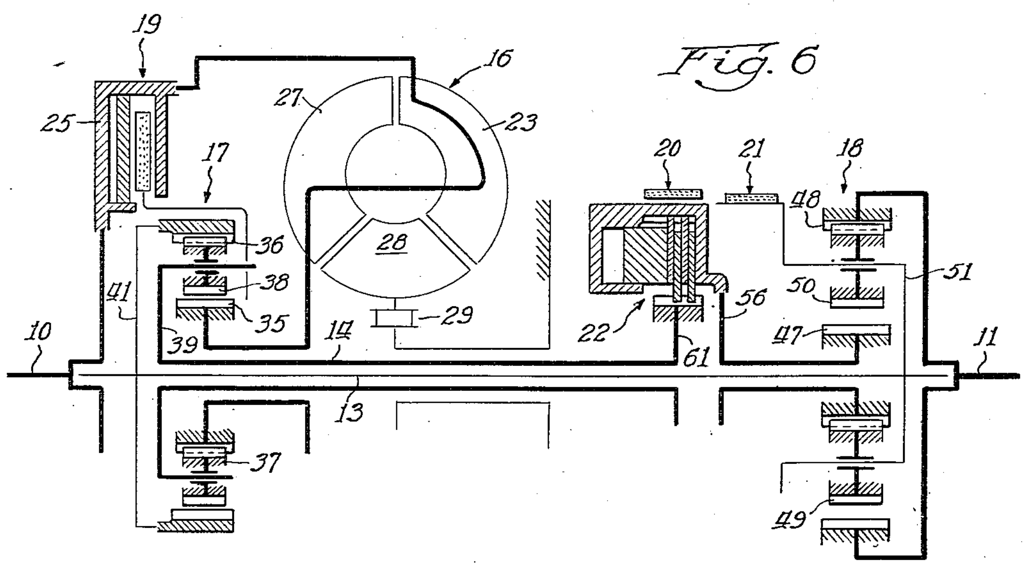
Inventor:
Donald W. Kelbel
By. Keith T. Blener
Atty United States Patent Office 2,762,237

Patented Sept. 11, 1956

2,762,237

TRANSMISSION

Donald W. Kelbel, Muncie, Ind., assignor to Borg-Warner Corporation, Chicago, Ill., a corporation of Illinois Application May 2, 1951, Serial No. 224,162

15 Claims. (Cl. 74—677)

My invention relates to transmissions and more particularly to transmissions for automotive vehicles.

It is an object of the present invention to provide an improved transmission of this type comprising a hydrodynamic coupling device, and more particularly a hydraulic torque converter, which transmits all of the power from the drive shaft of the transmission in a low speed forward drive, a portion only of the power from the drive shaft in an intermediate speed forward drive, a smaller portion of the power from the drive shaft in a high speed drive, and all of the power from the drive shaft in a reverse drive.

To this end it is an object of the invention to provide a transmission of this type comprising two planetary gear sets in connection with the hydrodynamic torque transmitting device. It is contemplated that the two planetary gear sets shall be connected in tandem for the first or low speed forward drive with both of the gear sets multiplying torque, that the first gear set shall be used for the intermediate speed drive for recombining power previously divided so that only a part of the drive shaft torque is transmitted through the hydrodynamic device with the second planetary gear set multiplying the power transmitted from the first planetary gear set and hydrodynamic device as in low speed forward drive and that the second planetary gear set shall be utilized for recombining torque previously divided so that a less portion of the power from the drive shaft is transmitted through the hydrodynamic device for the high speed forward drive. It is contemplated that preferably a clutch may be used for connecting an element of the first planetary gear set to the drive shaft for providing the division of power with respect to the hydrodynamic device.

The invention consists of the novel constructions, arrangements and devices to be hereinafter described and claimed for carrying out the above stated objects and such other objects as will appear from the following description of a preferred embodiment of the invention illustrated with reference to the accompanying drawings, wherein:

Fig. 1 is a longitudinal sectional view of a transmission embodying the principles of the invention;

Fig. 2 is a sectional view on an enlarged scale taken on line 2—2 of Fig. 1 in the direction indicated; and Figs. 3, 4, 5 and 6 are diagrammatic illustrations of the transmission showing the power trains through the transmission for low speed forward drive, intermediate speed forward drive, high speed forward drive and reverse drive, respectively.

Like characters of reference designate like parts in the several views.

Referring now to the drawings, the illustrated transmission comprises a drive shaft 10 and a driven shaft 11, both of which are rotatably disposed within a transmission case 12. The drive shaft 10 is adapted to be connected with the crankshaft of the engine of the automotive vehicle in which the transmission is installed, and the driven shaft 11 is adapted to be connected with the driving road wheels of the vehicle by any suitable, well-known drive connections (not shown). An intermediate shaft 13 is piloted with respect to the shafts 10 and 11, and sleeve shafts 14 and 15 are disposed over the shaft 13.

The transmission comprises in general, a hydraulic torque converter 16, planetary gear sets 17 and 18, a friction clutch 19, friction brakes 20 and 21 and a combination clutch and brake 22 of the friction type.

The hydraulic torque converter 16 comprises a bladed fluid impeller 23 the outer wall of which is formed by the converter housing 24 fixed to a flywheel 25. The flywheel 25 is connected with the drive shaft 10 by means of a flexible disc 26. The converter 16 comprises also a bladed rotor or driven element 27 and a bladed fluid redirecting stator 28. The stator 28 is rotatably disposed on the sleeve shaft 15 which is fixed with respect to the transmission housing 12.

A one-way brake 29 is provided between the stationary sleeve shaft 15 and the stator 28, and the one-way brake 29 comprises inner and outer cylindrical surfaces or races 30 and 31 and a plurality of tiltable sprags 32 adapted to wedge between the cylindrical races 30 and 31 so as to prevent a rotation of the stator 28 in the reverse direction indicated by the arrow A which is opposite to the direction of rotation of the drive shaft 10 indicated by the arrow B. The sprags 32 tilt clockwise as seen in Fig. 2 to allow a free forward rotation of the stator 28, that is, rotation in the same direction as is indicated by the arrow B. The sprags 32 are yieldably tilted to be in frictional contact with the surfaces 30 and 31 by means of a circular garter spring 33 disposed in slots 34 formed in the ends of the sprags 32.

The fluid torque converter 16 and the one-way brake 29 are common constructions, and hence further details of these constructions are not deemed necessary. The converter 16 functions when the fluid impeller 23 is driven from the shaft 10 to drive the rotor 27 at an increased torque with respect to that provided to the impeller. Fluid flows between the vanes of the impeller 23 and is impelled thereby so as to enter between and strike on the vanes of the rotor 27 causing a turning moment to be exerted on the rotor. The vanes of the stator 28 are so shaped as to redirect the fluid flowing from the rotor 27 to cause the fluid to impinge on the vanes of the impeller 23 in a direction tending to help rotation of the impeller 23 in the forward direction as indicated by the arrow B which provides the torque multiplying function in the converter 16 when the stator 28 is stationary. The reaction on the stator 28 under these conditions is in the reverse direction as indicated by the arrow A, and the one-way brake 29 prevents rotation of the stator in this direction. When the rotor 27 increases substantially in speed, the reaction in the reverse direction on the stator 28 ceases and reverses so that the stator begins to rotate in the forward direction as indicated by the arrow B, and this rotation of the stator is allowed by the one-way brake 29 which releases. Under these conditions the torque converter 16 functions as a simple fluid coupling with no multiplication of torque and with the impeller and runner rotating eventually at substantially the same speeds.

The planetary gear set 17 comprises a sun gear 35, a ring gear 36, a series of planet gears 37 (one being illustrated) in mesh with the sun gear 35 and a second series of planet gears 38 (one being illustrated) each of which is in mesh with one of the gears 37 and with the ring gear 36. A carrier 39 is provided for the planet gears 37 and 38 and is provided with stub shafts 40 on which each of the gears 37 and 38 are rotatably mounted. The ring gear 36 is fixed with respect to the shaft 13 by means of an annular hub 41 splined with respect to both the gear 36 and the shaft 13. The planet gear carrier 39 is rotatably mounted on the annular hub 41 and is splined to the shaft 14. The sun gear 35 has the rotor 27 of the hydraulic torque converter 16 fixed thereto and is rotatably mounted on the planet gear carrier 39.

The clutch 19 comprises an annular clutch disc 42 formed with openings for receiving certain of the planet gear shafts 40 for fixing the clutch disc with respect to the carrier 39. The clutch disc 42 is disposed between a pressure plate 43 fixed with respect to the converter housing 24 and an annular piston 44 movable to engage the clutch disc 42 between the piston and the pressure plate 43. The piston 44 is disposed between the inner surface of the flywheel 25 and an outer surface on an annular piston retainer 45 and is provided with seals 46 of yieldable material for sealing the piston with respect to these surfaces.

The planetary gear set 18 is the same dual planet gear type as the gear set 17 and comprises a sun gear 47, a ring gear 48, a series of planet gears 49 (one being illustrated) in mesh with the sun gear 47 and a series of spaced planet gears 50 (one being illustrated) each of which is in mesh with one of the planet gears 49 and is also in mesh with the ring gear 48. A carrier 51 is provided for the planet gears and has stub shafts 52 on which the gears 49 and 50 are mounted. The planet gear carrier 51 is splined on the central shaft 13, and the ring gear 48 is formed as a part of the driven shaft 11.

The brake 21 comprises a brake band 53 adapted to engage on a drum portion 54 on the carrier 51, and the brake band 53 may be actuated by any suitable motor, such as a fluid pressure actuated piston motor (not shown).

The brake 20 functions on the sun gear 47 and comprises an annular hollow member 55 connected by means of an annular hub member 56 with the sun gear 47, the member 56 being splined with respect to both the annular member 55 and the sun gear 47. The brake 20 comprises a brake band 57 adapted to engage a drum surface 58 on the member 55, and the brake band 57 may be engaged on the drum surface by the same type of actuating motor as that used for the brake 21.

The combination clutch and brake 22 comprises a plurality of plates 59 splined within the member 55 and a plurality of plates 60 interleaved with respect to the plates 59 and splined on a hub member 61 which in turn is splined on the shaft 14. The plates 59 are acted on by means of an annular piston 62 slidably disposed in a similarly shaped cavity 63 provided within the member 55 for compressing the plates between the piston 62 and the annular member 56. Sealing rings 64 and 65 of yieldable material respectively carried by the piston 62 and the member 55 seal the piston within the cavity 63, and fluid may be supplied to the cavity 63 by any suitable ducts, such as for example the passage 66. A plurality of springs 67 are provided for yieldably holding the piston 62 in its retracted position.

The illustrated transmission provides low, intermediate and high speed forward drives and a drive in reverse. In the low speed forward drive the hydraulic converter 16 transmits all of the power from the drive shaft 10; in the intermediate speed forward drive the hydraulic converter 16 transmits only a portion of the power from the drive shaft 10; in the high speed drive the hydraulic converter 16 transmits only a portion of the power from the drive shaft 10 which is less than that transmitted by the converter 16 in intermediate speed drive; and in reverse drive the hydraulic converter 16 transmits all of the power from the drive shaft 10.

Low speed forward drive is obtained by engaging the brake 20 and the engageable device 22, and in this case the latter device as a brake. Engagement of the brake 20 is obtained by actuating the motor (not shown) provided for this purpose, and engagement of the engageable device 22 is obtained by applying fluid pressure behind the piston 62 to move it against the springs 67 and press the discs 60 and 59 together. The brake 20 holds the annular member 55 stationary, and, through the hub member 56 the brake 20 holds the sun gear 47, so that this sun gear may act as the reaction member of the gear set 18. The engageable device 22 holds its hub 61 stationary with respect to the annular member 55 which is braked by the brake 20, and the shaft 14 and planet gear carrier 39 are thus braked, as they are connected with the hub 61. The planet gear carrier 39 in the gear set 17 thus acts as the reaction member of this gear set. The clutch 19 and brake 21 for this drive are disengaged.

The low speed forward drive power train (shown in heavy lines in Fig. 3) is from the drive shaft 10, through the flexible annular disc 26, the converter housing 24, the torque converter 16 including the impeller 23 and rotor 27, the sun gear 35 driven from the rotor 27, the planet gears 37 and 38, the ring gear 36, the hub member 41, the shaft 13, the planet gear carrier 51, the planet gears 49 and 50, and the ring gear 48 to the driven shaft 11. The torque converter 16 initially drives its rotor 27 and thereby the sun gear 35 at torque which is increased with respect to that applied to the drive shaft 10, and the torque converter 16 takes all of the power from the drive shaft 10, since none of it is divided out with respect to the converter. The planetary gear set 17, having its sun gear 35 rotated, drives its ring gear 36 at a reduced speed and increased torque in the forward direction with respect to the torque with which the sun gear 35 is driven, and the planet gear set 18 drives its ring gear 48 in the same direction and at an increased torque with respect to the torque with which the planet gear carrier 51 is driven from the gear set 17. Thus it will be apparent that the low speed drive through the transmission is provided by the hydraulic torque converter 16, the planetary gear set 17 and the planetary gear set 18 connected in series or tandem with each other with all of these units multiplying torque and with only a single path of power flow existing through the transmission. As the speed of the driven shaft 11 and the rotor 27 of the hydraulic converter 16 increase, the torque converter 16 may reach its "clutch point" at which the brake 29 releases, and at that time the torque converter ceases to convert torque and functions to drive the sun gear 35 at a substantial one to one drive with respect to the impeller 23.

Second or intermediate speed forward drive (Fig. 4) is obtained by releasing the engaging device 22 and engaging the clutch 19, allowing the brake 20 to remain engaged. The clutch 19 functions to provide a second path of power flow, exclusive of that through the converter 16, to the planetary gear set 17. The clutch 19 may be engaged by simply applying fluid under pressure behind the piston 44 so as to grip the clutch disc 42 between the pressure plate 43 and the piston 44. The clutch 19 when engaged connects the flywheel 25 with the shafts 40 of the planet gear carrier 39 extending through the clutch disc 42 so as to thereby connect the flywheel 25 and drive shaft 10 directly with the planet gear carrier 39. The sun gear 35 remains connected with the flywheel 25 through the hydraulic torque converter 16, and assuming that the rotor 27 is rotating at substantially the same speed as the impeller 23 (a change from low to intermediate drive is ordinarily made after the vehicle has reached an appreciable speed), both the carrier 39 and the sun gear 35 will thus be driven substantially at the speed of the drive shaft 10 so that all of the elements of the planet gear set 17 are rotating at substantially engine speed, and the ring gear 36 of the gear set constituting the output element of the gear set is driven substantially at engine speed with part of the power from the drive shaft 10 proceeding through the clutch 19 to the gear set 17 and with the other part of the power from the drive shaft 10 proceeding through the hydraulic torque converter 16 to the planet gear set 17. Assuming that the hydraulic torque converter 16 is at a substantial one to one drive, approximately 57% of the power from the drive shaft 10 is transmitted by the hydraulic torque converter 16 and the remaining 43% of the power from the drive shaft 10 is transmitted through the clutch 19, this particular division of power being due to the sizes of the particular gears used in the gear set 17 and the particular elements of the gear set that are respectively driven by the clutch 19 and the hydraulic torque converter 16. The ring gear 36 of the planetary gear set 17, as before, drives the shaft 13, and the torque from the shaft 13 is transmitted through and is multiplied by the planetary gear set 18 which drives the driven shaft 11 of the transmission from its ring gear 48.

Third speed forward drive (Fig. 5) is obtained by disengaging the brake 20 and engaging the engaging device 22, allowing the clutch 19 to remain engaged. Engagement of the engaging device 22 connects the shaft 14 through the hub 61 with the annular members 55 and 56 and the sun gear 47 of the gear set 18 thus completing a power train from the flywheel 25 through the clutch 19, the carrier 39 of the gear set 17, the shaft 14 and the engaging device 22 to the sun gear 47. Another power train which is in parallel with this power train, through the torque converter 16 to the planet gear carrier 51 of the gear set 18 remains completed as in intermediate speed drive, the power train being from the flywheel 25, through the torque converter 16, the sun gear 35, the planet gears 37 and 38, the ring gear 36, the shaft 13 to the carrier 51. Assuming that the speed of the shaft 11 and of the elements of the torque converter 16 are sufficiently high, as they usually are in high speed forward drive, the torque converter 16 is in its fluid coupling range, and the carrier 39 and sun gear 35 of the gear set 17 rotate at substantially drive shaft speed so that all the elements of the gear set 17 rotate substantially at this speed, and the carrier 51 and sun gear 47 of the gear set 18 are thus also rotated both at engine speed so that all of the elements of the gear set 18 also rotate at this speed, whereby the shaft 11 is given at substantially drive shaft speed. A substantial one to one or direct drive thus exists through the transmission. It will be observed that the engaging device 22 in this case functions as a clutch for connecting together the carrier 39 of the front gear set 17 and the sun gear 47 of the rear gear set 18. The power from the drive shaft which is split by means of the clutch 19 in this case is recombined within the rear planetary gear set 18. The connections between the torque converter 16 and the clutch 19 with the carrier 51 and the sun gear 47 of the rear planetary gear set 18 are such and the size of various gears in the gear set 18 are such that substantially 40% of the power from the drive shaft 10 is transmitted through the hydraulic torque converter 16, and 60% of the power from the drive shaft 10 is transmitted through the clutch 19 for this drive, assuming that the hydraulic torque converter 16 is in its coupling range driving its rotor 27 substantially at drive shaft speed. The new connections in this power train as compared with those in the intermediate speed power train thus reduce the amount of power through the hydraulic torque converter 16 from 57% to 40%.

For reverse drive (Fig. 6), the engaging device 22 and the brake 21 are engaged, the brake 20 and the clutch 19 being disengaged. The brake 21 functions to brake the carrier 51 of the rear planetary gear set 18 and thereby the ring gear 36 of the front planetary gear set 17, the carrier 51 being connected through the shaft 13 and annular hub 41 with the ring gear 36. The engaging device 22 in this case functions as in direct forward drive to connect together the carrier 39 of the front planetary gear set and the sun gear 47 of the rear planetary gear set 18. The drive in this case is from the drive shaft 10 through the flywheel 25, the torque converter impeller 23, the rotor 27, the sun gear 35, the planetary gears 37 and 38, the planet gear carrier 39, the sleeve shaft 14, the hub 61, the clutch 22, the annular hub member 56, the sun gear 47, the planet gears 49 and 50, and the ring gear 48 to the driven shaft 11. Inasmuch as the ring gear 36 is held stationary by means of the brake 21, rotation of the sun gear 35 by means of the hydraulic torque converter 16 causes a reverse rotation of the planet gear carrier 39 at a reduced speed with respect to that of the rotor 27, and the reverse rotation of the planet gear carrier 39 is transmitted through the shaft 14 and clutch 22 to the sun gear 47 which causes the ring gear 18 and driven shaft 11 to turn at increased torque and decreased speed in the reverse direction since the brake 21 is effective for holding the planet gear carrier 51 of the rear gear set 18. The two planet gear sets 17 and 18 for reverse drive are connected in tandem with each other and with the hydraulic torque converter 16, similar to low speed forward drive; however, for reverse drive the planet gear set 17 functions not only to multiply torque but also functions to cause a drive in the reverse direction. The hydraulic torque converter 16 and the rear planetary gear set 18 both function to multiply torque in this case. As in low speed forward drive, all of the power from the drive shaft 10 for reverse drive flows through the hydraulic torque converter 16, and for this drive, generally the reaction stator 28 of the torque converter 16 is stationary, being held in this condition by the one-way brake 29 so that the hydraulic converter 16 converts or multiplies torque, at least for starting conditions of the vehicle.

My improved transmission advantageously includes the two planetary gear sets 17 and 18 connected in tandem with the hydraulic torque converter 16 for the low speed forward drive with all of these three units converting torque for providing a high starting torque for the vehicle. For the intermediate speed drive, the power from the drive shaft 10 is split so that only a portion of it is transmitted through the hydraulic torque converter whereby excessive losses from transmitting all of the power from the drive shaft through the hydraulic torque converter in this speed ratio are not realized but nevertheless the soft coupling effect of the hydraulic torque converter which generally functions as a simple fluid coupling in this speed are available. For the high speed or direct drive in which most of the vehicle driving is done, a smaller portion of the power from the drive shaft 10 is transmitted through the hydraulic torque converter 16 so that losses within the hydraulic torque converter are reduced still further but nevertheless the relatively soft coupling effect of the hydraulic unit 16 are realized in this speed also. For reverse drive all of the power from the drive shaft 10 is transmitted through the hydraulic torque converter 16 for providing an advantageously high starting torque for the vehicle.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In transmission mechanism, the combination of a drive shaft, a driven shaft, a hydrodynamic torque converter comprising a fluid impeller, a runner or driven element receiving fluid from said impeller and driven thereby, a fluid redirecting stator and means for holding said stator against reverse rotation whereby the stator is effective to cause a multiplication of torque through the torque converter, means for providing a low speed forward drive power train between said shafts including said torque converter for receiving all of the power from said drive shaft and including first and second planetary gear sets connected in tandem with said torque converter; means for providing an intermediate speed forward drive power train between said shafts including said torque converter and means for dividing and recombining power from said drive shaft so that said hydrodynamic device transmits only a portion of the power from said drive shaft, said last named means including said first planetary gear set and a clutch for connecting an element of said gear set with said drive shaft, and means for providing a high speed forward drive power train between said shafts including said torque converter and power dividing and recombining means transmitting a smaller portion of the power from said drive shaft through said hydrodynamic device than in intermediate speed drive, said last named means including said two planetary gear sets and a clutch for connecting two elements of said gear sets together.

2. In transmission mechanism, the combination of a drive shaft, a driven shaft, a hydrodynamic torque transmitting device, means for providing a low speed forward drive power train between said shafts including said hydrodynamic device for receiving all of the power from said drive shaft, said last named means including two planetary gear sets connected in tandem between said hydrodynamic device and said driven shaft and means for holding certain reaction elements of said gear sets stationary whereby they both multiply torque, means for providing an intermediate speed forward drive power train between said shafts including said hydrodynamic device and including a clutch for connecting said drive shaft with an element of said first planetary gear set so that said hydrodynamic device transmits only a portion of the power from said drive shaft, and means for providing a high speed forward drive power train between said shafts including said hydrodynamic device and including clutch means for connecting elements of said two planetary gear sets together whereby power is transmitted from said first planetary gear set in two paths to said second planetary gear set, said last-mentioned means being constructed and arranged so that said hydrodynamic device transmits a smaller portion of the power from said drive shaft through said hydrodynamic device than in intermediate speed drive.

3. In transmission mechanism, the combination of a drive shaft, a driven shaft, a hydrodynamic torque transmitting device driven by said drive shaft, means for providing a low speed forward drive power train between said shafts including said hydrodynamic device for receiving all of the power from said drive shaft, said means including first and second planetary gear sets each having a power input element, a power output element, and a reaction element, the power input element of said first planetary gear set being connected with said hydrodynamic device to be driven thereby and said power output element of this gear set being connected with the power input element of said second planetary gear set, the power output element of said second planetary gear set being connected with said driven shaft whereby the planetary gear sets are connected in tandem between said hydrodynamic device and said driven shaft, brake means for holding the reaction elements of both of said gear sets for completing the low speed drive, means for providing an intermediate speed drive including said hydrodynamic device for transmitting a portion of the power from said drive shaft and including a clutch for connecting the reaction element of said first planetary gear set with said drive shaft whereby the power is divided through said clutch and said hydrodynamic device and is recombined in said first planetary gear set and said second planetary gear set multiplies the torque from said first planetary gear set with its reaction element being held stationary by the respective brake means, and means for providing a high speed forward drive power train between said shafts including said hydrodynamic device transmitting a smaller portion of the power from said drive shaft than in intermediate speed drive and including a clutch for connecting the reaction element of said first planetary gear set with the reaction element of said second planetary gear set whereby power from said first named clutch is transmitted to the reaction element of said second planetary gear set and the power through said first named clutch and said hydrodynamic device is recombined in said second planetary gear set.

4. In transmission mechanism, the combination of a drive shaft, a driven shaft, a hydrodynamic torque transmitting device driven by said drive shaft, means for providing a low speed forward drive power train between said shafts including said hydrodynamic device and including first and second planetary gear sets, each of said gear sets having an input element, an output element, and a reaction element, the input element of said first planetary gear set being connected to be driven by said hydrodynamic device and the output element of said first gear set being connected to drive the input element of said second gear set, the output element of said second gear set being connected with said driven shaft, a brake for the reaction element of said second gear set, an engaging means connecting said brake with said reaction element of said first gear set whereby both of the reaction elements are braked and the low speed power train is completed with both of said gear sets multiplying torque, means for providing an intermediate speed forward drive power train between said shafts including said hydrodynamic device which transmits only a portion of the power from said drive shaft and including a clutch for connecting the reaction element of said first gear set with said drive shaft for dividing the power transmitted from said drive shaft and for recombining the power from said torque converter and said clutch in said first gear set with said brake remaining engaged so that said second gear set multiplies torque, said engaging means completing one path of a dual path direct drive from said drive shaft through said clutch and the reaction element of said first gear set to the reaction element of said second gear set whereby the clutch divides the power from said drive shaft through said hydrodynamic device and the clutch and the said second gear set recombines the torque for providing a substantial one to one drive between said shafts with said hydrodynamic device transmitting a smaller portion of the power from said drive shaft than in intermediate speed drive, and a brake for the said input element of said second gear set so that this element now acts as a reaction member for completing a reverse drive power train when the brake and said engaging means are engaged, said brake holding said input element of said second gear set and the output element of said first gear set stationary so that these elements now act as reaction members for completing the reverse drive and said engaging means being engaged so that the reaction element of said first gear set is driven in a reverse direction from said hydrodynamic device to drive the reaction element of said second gear set in the reverse direction and the said second gear set multiplies the torque in reverse drive to said driven shaft.

5. In transmission mechanism, the combination of a drive shaft, a driven shaft, a hydrodynamic torque transmitting device having an impeller or driving element and a rotor or driven element, said impeller being connected with said drive shaft, a first planetary gear set having a sun gear, a ring gear, a planet gear in mesh with said sun gear, a planet gear in mesh with said first named planet gear and with said ring gear, and a carrier for said planet gears, a second planetary gear set having the same elements as said first planetary gear set, the sun gear of said first gear set being connected with said rotor to be driven thereby, the ring gear of said first gear set being connected with the carrier of said second gear set, engaging means for connecting the carrier of said first gear set with the sun gear of said second gear set, the ring gear of said second set being connected with said driven shaft to drive the latter shaft, a brake for the sun gear of said second gear set, and a clutch for connecting the carrier of said first gear set with said drive shaft, said brake and said engaging means when both are engaged completing a low speed forward drive between said shafts with all of the power from said drive shaft passing through said hydrodynamic device and both of said planetary gear sets multiplying torque, said clutch and said brake when both are engaged completing an intermediate speed forward drive power train with said clutch dividing a part of the power from said drive shaft from said hydrodynamic device and said first planetary gear set recombining the power and said second planetary gear set multiplying torque, said clutch and said engaging means when both are engaged completing a direct substantial one to one power train between said shafts with said clutch dividing the power from said drive shaft with respect to said hydrodynamic device and said second planetary gear set recombining the power.

6. In transmission mechanism, the combination of a drive shaft, a driven shaft, a hydrodynamic torque converter comprising a fluid impeller, a runner or driven element, receiving fluid from said impeller and driven thereby, a fluid redirecting stator and means for holding said stator against reverse rotation whereby the stator is effective to cause a multiplication of torque through the torque converter, said impeller being connected with said drive shaft to be driven thereby, a planetary gear set comprising a sun gear, a ring gear, a planet gear in mesh with said sun gear, a planet gear in mesh with said first named planet gear and with said ring gear, a planet gear carrier, a second planetary gear set comprising the same elements as said first named planetary gear set, the sun gear of said first planetary gear set being connected with said rotor to be driven thereby, the ring gear of said first planetary gear set being connected with the planet gear carrier of said second gear set, engaging means for connecting the carrier of said first planetary gear set with the sun gear of said second planetary gear set, the ring gear of said second planetary gear set being connected with said driven shaft for driving the latter, a brake for the sun gear of said second planetary gear set, a brake for the carrier of said second planetary gear set and the ring gear of said first planetary gear set, and a clutch for connecting the carrier of said first planetary gear set with said drive shaft, the brake for the sun gear of said second planetary gear set and said engaging means when engaged completing a low speed forward drive power train between said shafts with all of the power from said drive shaft being transmitted through said torque converter and with said two planetary gear sets being in tandem and both multiplying torque, the brake for the sun gear of said second planetary gear set and said clutch when both are engaged completing an intermediate speed forward drive power train between said shafts with said clutch dividing the power from said drive shaft with respect to the torque converter and the first planetary gear set recombining the power and said second planetary gear set multiplying torque, said engaging means and said clutch when both are engaged completing a substantial one to one direct drive power train between said shafts with power from said drive shaft being transmitted through the carrier of said first planetary gear set to the sun gear of said second planetary gear set and power through said torque converter being transmitted through the sun gear and ring gear of said first planet gear set to the carrier of said second planet gear set with the latter gear set combining the power from both these paths, the brake for the planet gear carrier of said second gear set and said engaging means when both are engaged completing a reverse drive power train between said shafts with all of the power from said drive shaft being transmitted through said torque converter and said first planetary gear set driving its planet gear carrier in the reverse direction at increased torque and the second planetary gear set multiplying the torque from said first planetary gear set and transmitting it to said driven shaft.

7. In transmission mechanism, the combination of a drive shaft, a driven shaft, a hydrodynamic torque transmitting device, means for providing a low speed forward drive power train between said shafts including said hydrodynamic device and means for dividing and recombining the power from said drive shaft so that said hydrodynamic device transmits only a portion of the power from said drive shaft, said last named means including a planetary gear set having two input elements and an output element, means connecting one of said input elements to said hydrodynamic device and a clutch for connecting the other input element with said drive shaft, and means for providing a relatively high speed forward drive power train between said shafts including said hydrodynamic device and power dividing and recombining means, said last-mentioned means being constructed and arranged to transmit a smaller portion of the power from said drive shaft through said hydrodynamic device than in said low speed drive, said last named recombining means including another planetary gear set having two input elements and an output element, one of said input elements being driven from said hydrodynamic device and the other input element being driven through said clutch.

8. In transmission mechanism, the combination of a drive shaft, a driven shaft, a hydrodynamic torque transmitting device, means for providing a relatively low speed forward drive power train between said shafts including said hydrodynamic device and means for dividing and recombining the power from said drive shaft so that said hydrodynamic device transmits only a portion of the power from said drive shaft, said recombining means including a first planetary gear set having a sun gear, a ring gear, a planet gear in mesh with the sun gear, a planet gear in mesh with said first named planet gear and with said ring gear, and a planet gear carrier, said sun gear being connected with said hydrodynamic device to be driven thereby and said planet gear carrier being connected with said drive shaft to divert a portion of the power from said drive shaft around said hydrodynamic device, a second planetary gear set comprising the same elements as said first planetary gear set and having its ring gear being connected with said driven shaft for driving the driven shaft, said ring gear of said first gear set being connected with the carrier of said second gear set whereby the latter gear set multiplies torque, means for providing a high speed forward drive power train between said shafts including said hydrodynamic device and power dividing and recombining means for transmitting a smaller portion of the power from said drive shaft through said hydrodynamic device than in said low speed drive and including means for connecting the sun gear of said second planetary gear set with said drive shaft whereby the latter is driven directly from the drive shaft and the planet gear carrier is driven through said hydrodynamic torque transmitting device.

9. In a transmission mechanism, the combination comprising a drive shaft; a driven shaft; a hydrodynamic torque transmitting device having a driving member connected to said drive shaft and a driven member; low speed power train means between said shafts comprising said hydrodynamic device, a first planetary gear set having a plurality of elements constructed and arranged to transmit torque through said first planetary gear set and means connecting said driven member of said hydrodynamic device to one element of said first gear set, said low speed power train means being constructed and arranged to cause all of the power from said drive shaft to pass through said hydrodynamic device; intermediate speed power train means between said shafts comprising said hydrodynamic device, said first planetary gear set, said means connecting said driven member of said hydrodynamic device to one element of said first gear set, and clutch means connecting another element of said first gear set to said drive shaft whereby a portion of the power from said drive shaft passes through said hydrodynamic device and the remainder of the power from said drive shaft passes through said clutch means; and high speed power train means between said shafts comprising said hydrodynamic device, said first planetary gear set, said means connecting said driven member to one element of said first gear set, said clutch means connecting said drive shaft to another element of said first gear set, a second planetary gear set having a plurality of elements constructed and arranged to transmit torque through said second planetary gear set including an element connected to said driven shaft, and engaging means interconnecting elements of said first and second planetary gear sets; said high speed power train means being so constructed and arranged that said hydrodynamic device transmits a smaller portion of the power from said drive shaft when said high speed power train is operable than when said intermediate speed power train is operable.

10. In a transmission, the combination comprising a drive shaft, a driven shaft, a hydrodynamic device, a first planet gear set having a plurality of drive and drive receiving elements constructed and arranged to transmit torque through the first planet gear set a first one of which receives power through said hydrodynamic device, a second planet gear set having a plurality of drive and drive receiving elements constructed and arranged to transmit torque through the second planet gear set a first one of which is connected to drive said driven shaft, a second one of said elements of said first gear set being connected in driving relation with a second element of said second planet gear set, a clutch for connecting a third element of said first planet gear set with a third element of said second planet gear set, and a brake for one of said two last-named elements for holding said third elements stationary when said clutch is also engaged for rendering these elements reaction elements for completing a drive between said shafts through said two planet gear sets, and another engaging device effective on one of the elements of said first gear set for completing a drive between said shafts when said clutch is also engaged during which drive power flows in multiple paths between said two gear sets, one path being between said second elements and the other path being between said third elements.

11. In a transmission, the combination comprising a drive shaft, a driven shaft, a hydrodynamic device, a first planet gear set having a plurality of drive and drive receiving elements constructed and arranged to transmit torque through the first planet gear set a first one of which receives power through said hydrodynamic device, a second planet gear set having a plurality of drive and drive receiving elements constructed and arranged to transmit torque through the second planet gear set a first one of which is connected to drive said driven shaft, a second one of said elements of said first gear set being connected in driving relation with a second element of said second planet gear set, a clutch for connecting a third element of said first planet gear set with a third element of said second planet gear set, and a brake for one of said two last-named elements for holding said third elements stationary when said clutch is also engaged for rendering these elements reaction elements for completing a drive between said shafts through said two planet gear sets, and a second clutch constructed and arranged effectively to connect one of said elements of said first gear set to said drive shaft for completing a drive between said shafts when said clutch is also engaged during which drive power flows in multiple paths between said two gear sets, one path being between said second elements and the other path being between said third elements.

12. In a transmission mechanism, the combination comprising a drive shaft, a driven shaft; a hydrodynamic torque converter comprising a fluid impeller, a runner or driven element receiving fluid from said impeller and driven thereby, a fluid redirecting stator, and means for holding said stator against reverse rotation whereby the stator is effective to cause a multiplication of torque through the torque converter, said impeller being connected with said drive shaft to be driven thereby; a first planet gear set having a plurality of drive and drive receiving elements constructed and arranged to transmit torque through the first planet gear set a first one of which receives power through said hydrodynamic torque converter, a second planet gear set having a plurality of drive and drive receiving elements constructed and arranged to transmit torque through said second planet gear set including a first one of which is connected to drive said driven shaft, a second one of said elements of said first gear set being connected in driving relation with a second element of said second gear set, a clutch for connecting a third element of said first planet gear set with a third element of said second planet gear set, and a brake for one of said two last-named elements for holding said third elements stationary when said clutch is also engaged for rendering these elements reaction elements to complete a drive between said shafts through said two planet gear sets, and another engaging device effective on one of said elements of said first gear set to complete a drive between said shafts when said clutch is also engaged during which drive power flows in multiple paths between said two gear sets, one path being between said second elements and the other path being between said third elements.

13. In transmission mechanism, the combination comprising a drive shaft, a driven shaft; a hydrodynamic torque converter comprising a fluid impeller, a runner or driven element receiving fluid from said impeller and driven thereby, a fluid redirecting stator, and means for holding said stator against reverse rotation whereby the stator is effective to cause a multiplication of torque through the torque converter, said impeller being connected with said drive shaft to be driven thereby; a first planetary gear set having a plurality of drive receiving and driving elements comprising a sun gear, a ring gear, a planet gear in mesh with said sun gear, another planet gear in mesh with said first mentioned planet gear and with said ring gear, and a planet gear carrier; a second planet gear set having a plurality of drive receiving and driving elements comprising the same elements as said first-mentioned planetary gear set, the sun gear of said first planetary gear set being connected to receive power from said runner, the ring gear of said first planetary gear set being connected to a drive receiving element of said second planetary gear set, the ring gear of said second planetary gear set being connected to said driven shaft, a first clutch operable to connect together an element of said first planetary gear set and an element of said second planetary gear set, and a brake adapted to hold said last two-named elements stationary when said first clutch is engaged to provide a relatively low speed forward drive between said drive and driven shafts, a second clutch operable with said torque converter when said first clutch is disengaged to effectively connect together two elements of said first planetary gear set for common rotation when said brake is also engaged to provide a relatively higher speed forward drive between said drive and driven shafts, both of said clutches being operable simultaneously when said brake is disengaged to provide a high speed forward drive between said drive and driven shafts.

14. In transmission mechanism, the combination of a drive shaft, a driven shaft, a hydrodynamic torque transmitting device including a driving member connected to said drive shaft and a driven member, means for providing a low speed forward drive power train between said shafts including said hydrodynamic device for receiving all of the power from said drive shaft, means for providing an intermediate speed forward drive power train between said shafts including said hydrodynamic device and including means for dividing and recombining the power from said drive shaft so that said hydrodynamic device transmits only a portion of the power from said drive shaft, said dividing and recombining means including a planetary gear set having a plurality of driving and drive receiving elements drivingly connected with each other, means connecting one of said elements with said driven member of said hydrodynamic device and a clutch for connecting another of said elements with said drive shaft, and means for providing a high speed forward drive power train between said shafts including said hydrodynamic device and power dividing and recombining means including said planetary gear set and a second planetary gear set having an element connected with an element of said first-mentioned planetary gear set through a selectively operable engaging device, said high speed forward drive power train providing means being constructed and arranged to transmit a smaller portion of the power from said drive shaft through said hydrodynamic device than in intermediate speed, said second planetary gear set having an element connected to said driven shaft.

15. In transmission mechanism, the combination of a drive shaft, a driven shaft, a hydrodynamic torque transmitting device, means for providing a low speed forward drive power train between said shafts including said hydrodynamic device for receiving all the power from said drive shaft and including first and second planetary gear sets connected in tandem with said hydrodynamic device, means for providing an intermediate speed forward drive power train between said shafts including said hydrodynamic device and including means for dividing and recombining power from said drive shaft including said first planetary gear set so that said hydrodynamic device transmits only a portion of the power from said drive shaft, said dividing and recombining means also including a clutch for connecting an element of said first gear set with said drive shaft, and means for providing a high speed forward drive power train between said shafts including said hydrodynamic device and a second power dividing and recombining means including said second gear set, said high speed forward drive power train providing means being constructed and arranged to transmit a smaller portion of the power from said drive shaft through said hydrodynamic device than in intermediate speed drive, said second power dividing and recombining means including a clutch for connecting an element of said first planetary gear set with an element of said second planetary gear set, said second planetary gear set having an element connected to said driven shaft.

References Cited in the file of this patent

UNITED STATES PATENTS

| | | |
|---|---|---|
| 2,211,233 | Kelley | Aug. 13, 1940 |
| 2,277,214 | Dodge | Mar. 24, 1942 |
| 2,301,451 | Pollard | Nov. 10, 1942 |
| 2,302,714 | Pollard | Nov. 24, 1942 |
| 2,312,849 | Pollard | Mar. 2, 1943 |
| 2,324,713 | McFarland | July 20, 1943 |
| 2,352,004 | Pollard | June 20, 1944 |
| 2,353,905 | Kelley | July 18, 1944 |
| 2,372,817 | Dodge | Apr. 3, 1945 |
| 2,414,359 | Carnagua | Jan. 14, 1947 |
| 2,454,014 | Seybold | Nov. 16, 1948 |
| 2,572,007 | Burtnett | Oct. 23, 1951 |

FOREIGN PATENTS

| | | |
|---|---|---|
| 966,238 | France | Oct. 4, 1950 |